(12) United States Patent
Weng et al.

(10) Patent No.: US 11,551,136 B2
(45) Date of Patent: Jan. 10, 2023

(54) N-BEST SOFTMAX SMOOTHING FOR MINIMUM BAYES RISK TRAINING OF ATTENTION BASED SEQUENCE-TO-SEQUENCE MODELS

(71) Applicant: TENCENT America LLC, Palo Alto, CA (US)

(72) Inventors: Chao Weng, Fremont, CA (US); Jia Cui, Bellevue, WA (US); Guangsen Wang, Shenzhen (CN); Jun Wang, Shenzhen (CN); Chengzhu Yu, Bellevue, WA (US); Dan Su, Shenzhen (CN); Dong Yu, Bothell, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 1093 days.

(21) Appl. No.: 16/191,027

(22) Filed: Nov. 14, 2018

(65) Prior Publication Data

US 2020/0151623 A1    May 14, 2020

(51) Int. Cl.
  *G06N 20/00*     (2019.01)
  *G06N 3/04*      (2006.01)
  *G06N 3/08*      (2006.01)
  *G06F 40/47*     (2020.01)
  *G06V 10/70*     (2022.01)
  *G06K 9/62*      (2022.01)
  *G10L 15/06*     (2013.01)

(52) U.S. Cl.
  CPC ............ *G06N 20/00* (2019.01); *G06F 40/47* (2020.01); *G06K 9/6296* (2013.01); *G06V 10/768* (2022.01); *G10L 15/063* (2013.01)

(58) Field of Classification Search
  None
  See application file for complete search history.

(56) References Cited

U.S. PATENT DOCUMENTS

| | | | |
|---|---|---|---|
| 9,875,440 B1 | 1/2018 | Commons | |
| 11,107,463 B2* | 8/2021 | Prabhavalkar | G10L 15/063 |
| 11,308,325 B2* | 4/2022 | McClernon | G06V 10/764 |
| 2013/0132083 A1 | 5/2013 | Yu et al. | |
| 2014/0278981 A1 | 9/2014 | Mersov et al. | |
| 2014/0303973 A1 | 10/2014 | Amarilli et al. | |
| 2016/0005398 A1 | 1/2016 | Kingsbury et al. | |
| 2017/0040016 A1* | 2/2017 | Cui | G10L 15/02 |
| 2018/0068654 A1* | 3/2018 | Cui | G10L 15/075 |
| 2019/0266246 A1* | 8/2019 | Wang | G06N 3/04 |
| 2020/0013124 A1* | 1/2020 | Obee | G06Q 40/08 |

FOREIGN PATENT DOCUMENTS

| | | | | |
|---|---|---|---|---|
| CN | 109190703 A | * | 1/2019 | G06F 40/58 |
| WO | WO-2020101743 A1 | * | 5/2020 | G06F 17/2836 |

OTHER PUBLICATIONS

International Search Report and Written Opinion, dated Aug. 16, 2019 from the International Bureau in counterpart International application No. PCT/US2019/035358.

* cited by examiner

*Primary Examiner* — Mohammed Rachedine
(74) *Attorney, Agent, or Firm* — Sughrue Mion, PLLC

(57) ABSTRACT

A method and apparatus are provided that analyzing sequence-to-sequence data, such as sequence-to-sequence speech data or sequence-to-sequence machine translation data for example, by minimum Bayes risk (MBR) training a sequence-to-sequence model and within introduction of applications of softmax smoothing to an N-best generation of the MBR training of the sequence-to-sequence model.

20 Claims, 5 Drawing Sheets

N-BEST SOFTMAX SMOOTHING FOR MINIMUM BAYES RISK TRAINING OF ATTENTION BASED SEQUENCE-TO-SEQUENCE MODELS

BACKGROUND

1. Field

The disclosed subject matter relates to training and output with respect to attention based sequence-to-sequence models in end-to-end recognition systems, such as speech recognition and machine translation.

2. Description of Related Art

Speech recognition and machine translation involving Minimum Bayes risk (MBR), a training criteria, training commonly make over-confident predictions. For example, attention based sequence-to-sequence models may be applied to neural machine translation, and MBR training of attention based sequence-to-sequence models may result in label predictions conditioned on acoustic inputs and previously emitted labels. However, use of lattices as a hypothesis set in such models and training presents the technical problem of practically complicating the forward computation procedure of the MBR training. An N-best consideration obtained by a beam-search may technically improve such problems as efficient and effective for MBR training.

However, even so, such an attention based sequence-to-sequence model may tend to make over-confident predictions which results in other technical problems. For example, when using a beam search during MBR training, the resulting over-confident predictions may lead to too many alike hypothesized sequences among resulting N-best outputs and thereby prevent the MBR training procedures from obtaining desired diversity in its hypothesis space. Therefore, even with using beam searching there still remains technical problems regarding the N-best outputs in that practically too many alike hypothesized sequences may result from over-confident predictions.

Therefore, performance in MBR trained and attention based sequence-to-sequence models may be improved by solving technical problems resulting from over-confident predictions involved in attention based sequence-to-sequence models.

SUMMARY

In view of previous attempts at improving performance in MBR trained and attention based sequence-to-sequence models, where such attempts undesirably led to overconfident predictions and inadequately diverse hypothesis spaces, the disclosed subject matter herein describes achieving such improved performance. Exemplary embodiments introduce softmax smoothing into N-best generation during MBR training and thereby combat issues of over-confident predictions of such attention based sequence-to-sequence models and may be applied to various sequence-to-sequence tasks such as speech recognition and machine learning.

According to exemplary embodiments, there is an apparatus and a method in which there is at least one memory configured to store computer program code and at least one hardware processor configured to access said computer program code and operate as instructed by said computer program code including minimum Bayes risk (MBR) training code configured to cause said at least one hardware processor to train a sequence-to-sequence mode and smoothing code configured to cause said at least one hardware processor to apply softmax smoothing to an N-best generation of the MBR training.

According to exemplary embodiments, the apparatus and method further include beam search code configured to cause said at least one hardware processor to perform a beam search during the MBR training.

According to exemplary embodiments, the apparatus and method further include beam search code further configured to during each step or iteration of the beam search, apply the softmax smoothing to a label prediction distribution.

According to exemplary embodiments, the apparatus and method further comprises obtaining code configured to cause said at least one processor to obtain, as a result of applying the softmax smoothing, a plurality of hypothesized outputs applied to a hypothesis space for the MBR training.

According to exemplary embodiments, the apparatus and method further, for the MBR training code is configured to cause said at least one processor to apply an MBR loss operation to a plurality of pairs of training data and corresponding reference label sequences.

According to exemplary embodiments, the apparatus and method further include training data that comprises training speech utterance data.

According to exemplary embodiments, the apparatus and method further include training data that comprises training machine translation data.

According to exemplary embodiments, the apparatus and method further include an MBR loss operation that comprises a risk operation between a hypothesized label sequence and ones of the reference label sequences.

According to exemplary embodiments, the apparatus and method further include an MBR loss operation that comprises a sequence probability given the training data.

According to exemplary embodiments, the apparatus and method further derive gradients of the MBR loss operation with respect to a probability, of the sequence-to-sequence model emitting a particular label of the label prediction distribution, and the risk operation.

BRIEF DESCRIPTION OF THE DRAWINGS

Further features, nature, and various advantages of the disclosed subject matter will be more apparent from the following detailed description and the accompanying drawings in which.

DETAILED DESCRIPTION

Figure 1:
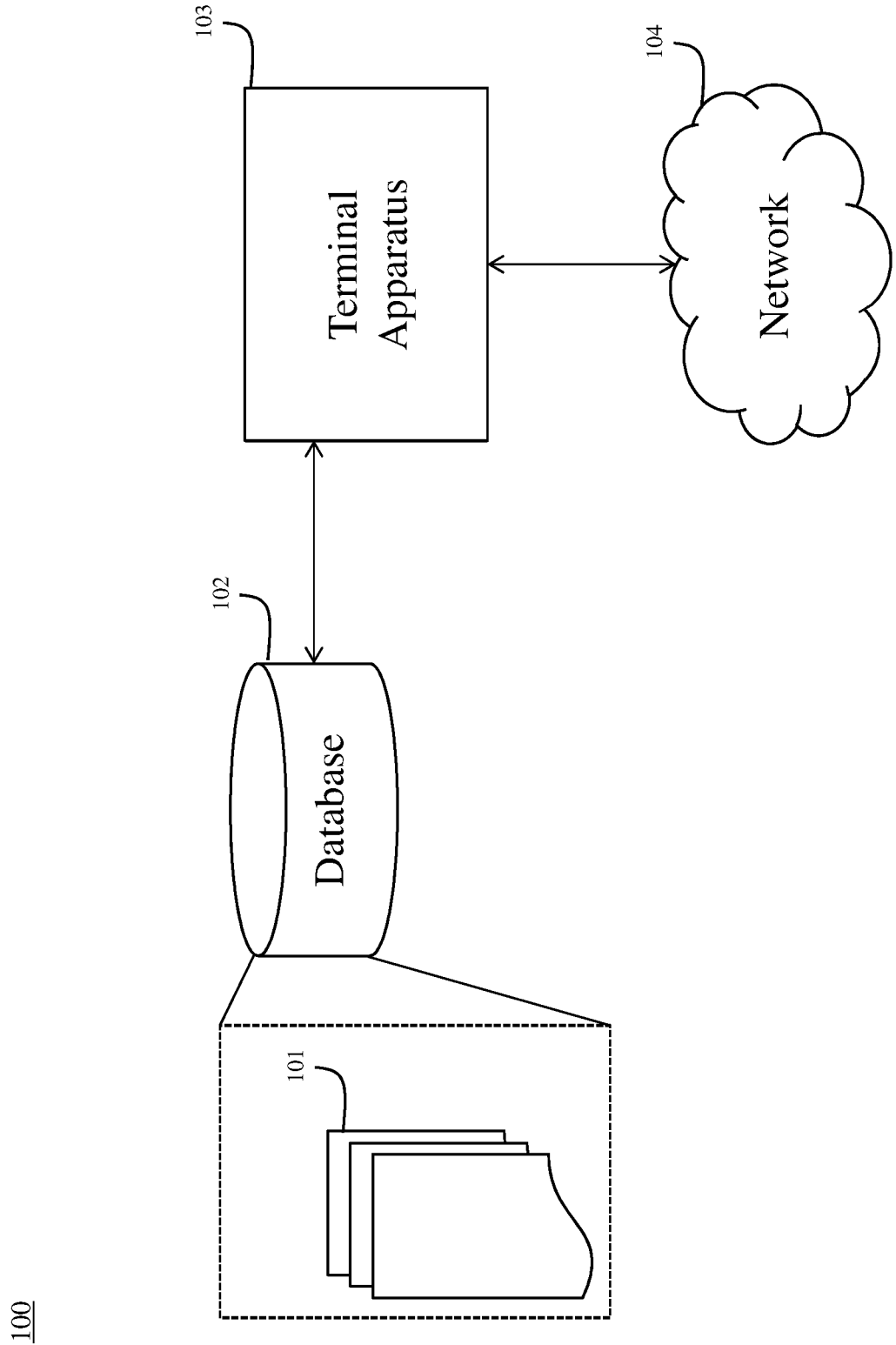
FIG. 1 is a schematic illustration of a simplified block diagram of a system in accordance with an embodiment.

FIG. 1 is an illustration of a simplified block diagram of a system 100 in accordance with an embodiment.

Figure 3:
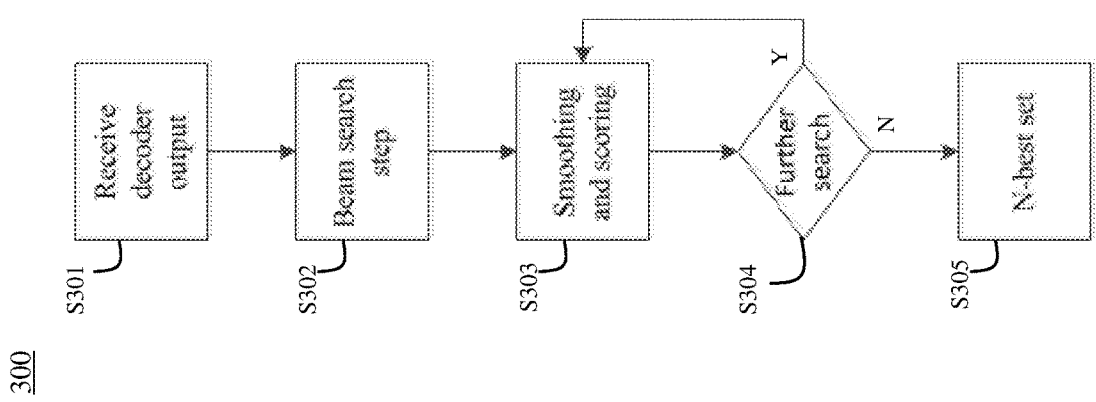
FIG. 3 is a schematic illustration of a simplified flow chart of a communication system in accordance with an embodiment.
Figure 4:
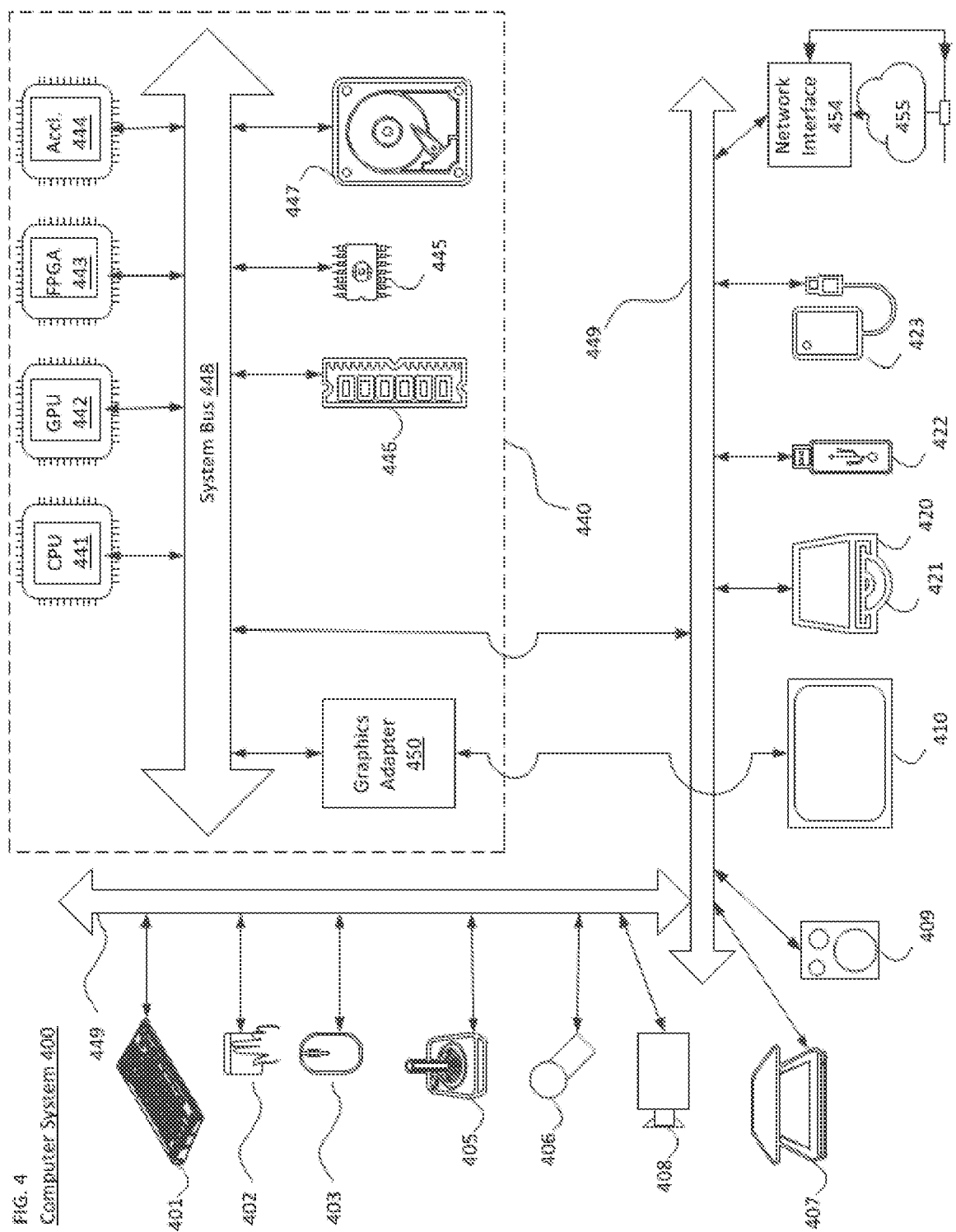
FIG. 4 is a schematic illustration of a simplified block diagram of a system in accordance with an embodiment.

There is a terminal apparatus 103 which includes connections to a database 102 and a network 104, which may be any of an intranet or the internet, and includes any of various hardware described further with respect to FIG. 4 such as at least one hardware processor, a memory and a decoder for example. The terminal apparatus 103 is configured to implement MBR training for attention based sequence-to-sequence models by referring to any of data 101 from the database 102, from the network 104 or otherwise input to the terminal apparatus as described further with respect to FIGS. 2 and 3.

The database 102 may be included in the terminal apparatus 103, and the terminal apparatus 103 may also transmit control to the network 104 to implement MBR training for attention based sequence-to-sequence models.

Figure 2:
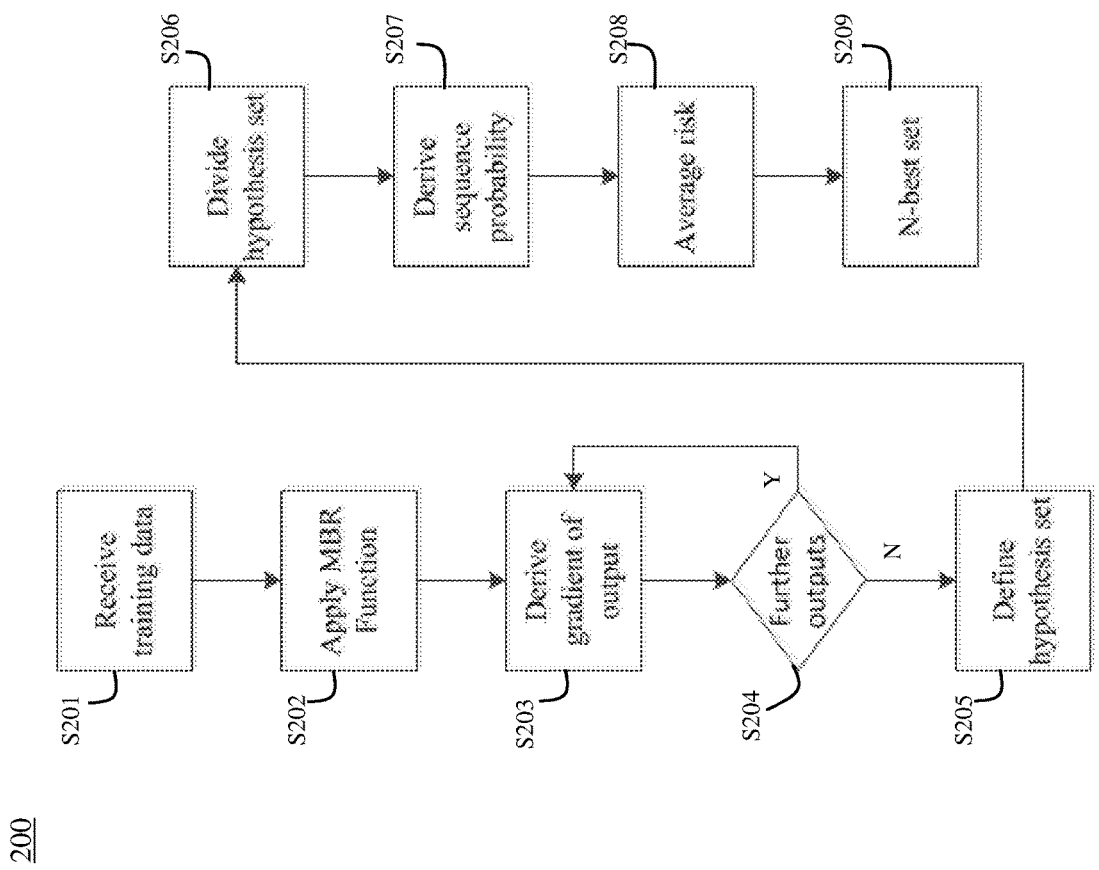
FIG. 2 is a schematic illustration of a simplified flow chart of a communication system in accordance with an embodiment.

FIG. 2 illustrates a flowchart 200 regarding MBR training for attention based sequence-to-sequence models.

At S201, training data is received, such as at the terminal apparatus 103, by which to perform MBR training.

At S202, an MBR function or operation, such as an MBR loss function with use of the below-described risk function and sequence probability, is applied as, for example:

$$L_{MBR}(x_{1:U}, y^r_{1:U}) = \sum_{u=1}^{U} \sum_{y_u} \frac{P(y_u | x_u) R(y_u, y^r_u)}{\sum_{y'_u} P(y'_u | x_u)}, \quad (1)$$

For that function, consider that y denotes an output sequence from the sequence-to-sequence model: $y = y_1, y_2, y_i, \ldots y_L$ and is given U pairs of the training speech utterance x and its corresponding reference label sequence $y^r$.

Further, $y_u$ represents one of hypothesized output label sequences and corresponds to the $$x_u \cdot R(y_u, y^r_u)$$

is the risk function between a hypothesized and reference label sequence, e.g., edit-distance. $P(y_u|x_u)$ is the sequence probability given input $x_u$.

According to the chain rule:

$$P(y_u | x_u) = P(y_1, y_2, y_i, \ldots, y_L | x_u) = \quad (2)$$
$$p(y_1 | x_u) p(y_2 | y_1, x_u) \ldots p(y_L | y_{1:L-1}, x_u) = \prod_{i=1}^{L} p(y_i | y_{1:i-1}, x_u).$$

At S203, gradients of outputs of that function from S202 may be derived. For example, note that $p(y_i|y_{1:i-1},x_u)$ is exactly the output of sequence-to-sequence model. Therefore, to perform MBR training of a sequence-to-sequence model, exemplary embodiments derive the gradients of MBR loss function with respect to $p(y_i|y_{1:i-1},x_u)$.

At S204, it is considered whether further gradient outputs from S203 are pending and if not, proceeds to S205 at which a hypothesis set may be defined as follows. For convenience, it may be considered in defining such hypothesis set where $p(y_i=y)$ is shorthand for $p(y_i=y|y_{1:i-1},x_u)$, i.e., the probability of the model emitting a particular label y at the step i, $f(y_u)$ and $g(y_u)$ are short-hands for $P(y_u|x_u)$ and $$R(y_u, y^r_u)$$

in Eq. (1).

Accordingly, we define a hypothesis set $S=\{y_u|y_i=y\}$ which contains all the hypothesized sequences whose ith label is y in S205.

At S206, that hypothesis may be divided. For example, all hypothesized sequences may be divided into two disjoint sets, $y_u \in S$ and $y_u \notin S$, and the MBR loss function may be rewritten as:

$$L_{MBR} = \sum_{u=1}^{U} \frac{\sum_{y_u \in S} f(y_u) g(y_u) + \sum_{y_u \notin S} f(y_u) g(y_u)}{\sum_{y'_u \in S} f(y'_u) + \sum_{y'_u \notin S} f(y'_u)}. \quad (3)$$

$$\partial \sum f(y_u)$$

At S207, there is notice of $$\frac{y_u \notin S}{\partial p(y_i = y)} = 0$$

by which a derivative of MBR loss function with respect to:

$$\log p(y_i = y), \quad (4)$$

$$\frac{\partial L_{MBR}}{\partial \log p(y_i = y)} =$$

$$\sum_{u=1}^{U} \frac{\partial L_{MBR}}{\partial p(y_i = y)} \cdot \frac{\partial p(y_i = y)}{\partial \log p(y_i = y)} = \sum_{u=1}^{U} \frac{\partial L_{MBR}}{\partial p(y_i = y)} \cdot p(y_i = y) =$$

$$\sum_{u=1}^{U} \left( \frac{\sum_{y_u \in S} f(y_u) g(y_u)}{\sum_{y'_u} f(y'_u)} - \frac{\sum_{y_u} f(y_u) g(y_u) \sum_{y_u \in S} f(y_u)}{\left[\sum_{y'_u} f(y'_u)\right]^2} \right) =$$

$$\sum_{u=1}^{U} \sum_{y_u \in S} \gamma(y_u)(g(y_u) - \overline{R}_u),$$

Further from Eq. (4), it is considered that $\gamma(y_u)$ is the normalized sequence probability, $$\text{i.e., } \gamma(y_u) = \frac{f(y_u)}{\sum_{y'_u} f(y'_u)} = \frac{P(y_u | x_u)}{\sum_{y'_u} P(y'_u | x_u)}.$$

At S208, an averaged risk from S207 may be taken. For example, $\overline{R}_u$ may be taken as an averaged risk among all the hypothesized sequences for the training utterance u, $$\overline{R}_u = \frac{\sum_{y_u} f(y_u) g(y_u)}{\sum_{y'_u} f(y'_u)} = \sum_{y_u} \gamma(y_u) R(y_u, y^r_u). \quad (5)$$

And at S209, an N-best set consideration may occur at which an N-best set for MBR training is obtained by re-scoring the hypothesis set according to:

$$\text{score } (y, x) = \log P(y | x) / \left( \frac{(5 + |y|)^\alpha}{(5 + 1)^\alpha} \right). \quad (6)$$

The N-best set of S209 is described further with respect to FIG. 3, and according to exemplary embodiments represents a top N best hypothesized outputs from some recognizer, such as a speech recognizer, and may be used for a hypothesis space for MBR training or other discriminative training.

FIG. 3 illustrates a flowchart 300 regarding N-best generation for MBR training.

At S301, an output, such as $O^{dec}$ output from a decoder of an attention based sequence-to-sequence model, is obtained.

At S302, a step of a beam search occurs, and at S303, the method introduces softmax smoothing into N-best generation for MBR training. Specifically, when searching for N-best during MBR training, β is used to smooth the label prediction distribution and generate the scores at each step of beam-search as, $$p(y_i|y_{1:i-1}, x) = \text{softmax}(\beta O^{dec}), \beta < 1, \quad (7)$$

Beam searching is a method which may be built on an encoder-decoder system and may approximate searches to obtain results from various candidates, such as from a search tree based on costs of searching, for example.

At S303, it is considered whether the beam search, with such added smoothing in S303, is completed and if so, at S305, an N-best set is obtained.

According to exemplary embodiments, such method is compared against MBR training without N-best softmax smoothing on two most widely used benchmarks for English conversational speech recognition, Switchboard-300 hrs and Switchboard+Fisher-2000 hrs. For both methods, the following configurations are used for comparisons:
  (1) 40-dimensional log-mel filterbanks, the central frame is spliced with left 5 plus right 3 frames are taken.
  (2) Targets are a set of 49 characters which contains English letters, numbers, punctuations, special transcribed notations in Switchboard include '[laughter]', '[noise]', '[vocalized-noise]' plus '⟨space⟩', '⟨SOS⟩', '⟨EOS⟩' which are used as the indicators for the word boundary, start and end of the sequence.
  (3) 6-layer stacked bidirectional and two-layer unidirectional LSTMs are used for the encoder and decoder, both with 512 hidden units. MLP based attention module is adopted in the experiments. MLP is a multi-layer perceptron which is a class of feedforward artificial network. LSTMs are long short-term memory units and are a kind of recurrent neural network.
  (4) Adam optimization algorithm is used for all experiments where $\beta_1=0.9$, $\beta_2=0.999$, $\varepsilon=10^{-8}$ And the learning rate is set to $3\times10^{-6}$.
  (5) The performances are evaluated on three standard test set, Eval2000-Switchboard, Eval2000-Callhome and Eval2000.

Experimental results are shown in Table 1 and Table 2 which demonstrate that by the MBR training with N-best softmax smoothing, as compared to without, the performances of speech recognition are consistently better.

In the below table, "WER" refers to word error rate as a performance metric recognition system where a lower rate is more preferable.

TABLE 1

Experimental Results on Switchboard-300 hrs benchmark

| Methods | WERs(%) | |
|---|---|---|
| | Eval2000-Switchboard | Eval2000 |
| MBR | 12.5 | 18.3 |
| MBR + Nbest softmax smoothing | 12.2 | 17.8 |

TABLE 2

Experimental Results on Switchboard + Fisher-2000 hrs benchmark

| Methods | WERs(%) | |
|---|---|---|
| | Eval2000-Switchboard | Eval2000-Callhome |
| MBR | 8.3 | 16.1 |
| MBR + Nbest softmax smoothing | 8.3 | 15.5 |

According to exemplary embodiments, such MBR training may be used for any variations of attention based sequence-to-sequence models, such as machine translation and end-to-end speech recognition.

The techniques described above, can be implemented as computer software using computer-readable instructions and physically stored in one or more computer-readable media or by a specifically configured one or more hardware processors. For example, FIG. 4 shows a computer system 400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 4 for computer system 400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 400.

Computer system 400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 401, mouse 402, trackpad 403, touch screen 410, joystick 405, microphone 406, scanner 407, camera 408.

Computer system 400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 410, or joystick 405, but there can also be tactile feedback devices that do not serve as input devices), audio output devices (such as: speakers 409, headphones (not depicted)), visual output devices (such as screens 410 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 400 can also include human accessible storage devices and their associated media such as optical media including CD/DVD ROM/RW 420 with CD/DVD or the like media 421, thumb-drive 422, removable hard drive or solid state drive 423, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 400 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANbus, and so forth. Certain networks commonly require external network interface adapters that attached to certain general-purpose data ports or peripheral buses (449) (such as, for example USB ports of the computer system 400; others are commonly integrated into the core of the computer system 400 by attachment to a system bus as described below (for example Ethernet interface into a PC computer system or cellular network interface into a smartphone computer system). Using any of these networks, computer system 400 can communicate with other entities. Such communication can be uni-directional, receive only (for example, broadcast TV), uni-directional send-only (for example CANbus to certain CANbus devices), or bidirectional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 440 of the computer system 400.

The core 440 can include one or more Central Processing Units (CPU) 441, Graphics Processing Units (GPU) 442, specialized programmable processing units in the form of Field Programmable Gate Areas (FPGA) 443, hardware accelerators for certain tasks 444, and so forth. These devices, along with Read-only memory (ROM) 145, Random-access memory 446, internal mass storage such as internal non-user accessible hard drives, SSDs, and the like 447, may be connected through a system bus 448. In some computer systems, the system bus 448 can be accessible in the form of one or more physical plugs to enable extensions by additional CPUs, GPU, and the like. The peripheral devices can be attached either directly to the core's system bus 448, or through a peripheral bus 449. Architectures for a peripheral bus include PCI, USB, and the like.

CPUs 441, GPUs 442, FPGAs 443, and accelerators 444 can execute certain instructions that, in combination, can make up the aforementioned computer code. That computer code can be stored in ROM 445 or RAM 446. Transitional data can be also be stored in RAM 446, whereas permanent data can be stored for example, in the internal mass storage 447. Fast storage and retrieve to any of the memory devices can be enabled through the use of cache memory, that can be closely associated with one or more CPU 441, GPU 442, mass storage 447, ROM 445, RAM 446, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 400, and specifically the core 440 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 440 that are of non-transitory nature, such as core-internal mass storage 447 or ROM 445. The software implementing various embodiments of the present disclosure can be stored in such devices and executed by core 440. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 446 and modifying such data structures according to the processes defined by the software. In addition or as an alternative, the computer system can provide functionality as a result of logic hardwired or otherwise embodied in a circuit (for example: accelerator 444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Figure 5:
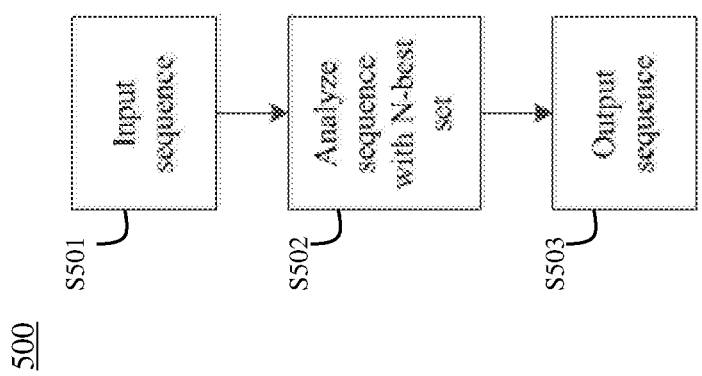
FIG. 5 is a schematic illustration of a simplified flow chart of a communication system in accordance with an embodiment.

FIG. 5 illustrates a flowchart 500 simplified regarding use of such improved MBR training attention bases sequence-to-sequence model.

For example at S501, some sequence, machine translation or audio/speech input, may be obtained.

At S502, analysis with the N-best set, such as described with respect to FIGS. 2 and 3, may convert the input sequence to an output sequence, and such of such N-best set would avoid the above-described issues of over-confident predictions of such attention based sequence-to-sequence models.

At S503, a converted to sequence may be output by which a user, such as at the user terminal 103, may view or listen to such converted sequence.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An apparatus comprising:
    at least one memory configured to store computer program code;
    at least one hardware processor configured to access said computer program code and operate as instructed by said computer program code, said computer program code including:
        minimum Bayes risk (MBR) training code configured to cause said at least one hardware processor to train a sequence-to-sequence model by MBR training; and
        smoothing code configured to cause said at least one hardware processor to, during an N-best generation of the MBR training, apply, by softmax smoothing, smoothing to a label prediction distribution and generate scores at each step of a beam-search of the N-best generation of the MBR training.

2. The apparatus according to claim 1, wherein the computer program code further includes beam search code configured to cause said at least one hardware processor to perform the beam search during the MBR training.

3. The apparatus according to claim 2, wherein the beam search code is further configured to, during each iteration of the beam search, apply the softmax smoothing to the label prediction distribution.

4. The apparatus according to claim 3, wherein the computer program code further comprises obtaining code configured to cause said at least one processor to obtain, as a result of applying the softmax smoothing, a plurality of hypothesized outputs applied to a hypothesis space for the MBR training.

5. The apparatus according to claim 1, wherein the MBR training code is configured to cause said at least one processor to apply an MBR loss operation to a plurality of pairs of training data and corresponding reference label sequences.

6. The apparatus according to claim 5, wherein the training data comprises training speech utterance data.

7. The apparatus according to claim 5, wherein the training data comprises training machine translation data.

8. The apparatus according to claim 5, wherein the MBR loss operation comprises a risk operation between a hypothesized label sequence and ones of the reference label sequences.

9. The apparatus according to claim 5, wherein the MBR loss operation comprises a sequence probability given the training data.

10. The apparatus according to claim 8, wherein the MBR training further comprises deriving gradients of the MBR loss operation with respect to a probability, of the sequence-to-sequence model emitting a particular label of the label prediction distribution, and the risk operation.

11. A method performed by at least one computer processor comprising:
    minimum Bayes risk (MBR) training a sequence-to-sequence model by MBR training; and
    during an N-best generation of the MBR training, applying, by softmax smoothing, smoothing to a label prediction distribution and generating scores at each step of a beam search of the N-best generation of the MBR training.

12. The method according to claim 11, further comprising:
    performing the beam search during the MBR training.

13. The method according to claim 12, further comprising:
    during each step of the beam search, applying the softmax smoothing to the label prediction distribution.

14. The method according to claim 13, further comprising:
    obtaining, as a result of applying the softmax smoothing, a plurality of hypothesized outputs applied to a hypothesis space for the MBR training.

15. The method according to claim 11, wherein the MBR training comprises applying an MBR loss operation to a plurality of pairs of training data and corresponding reference label sequences.

16. The method according to claim 15, wherein the training data comprises training speech utterance data.

17. The method according to claim 15, wherein the training data comprises training machine translation data.

18. The method according to claim 15, wherein the MBR loss operation comprises a risk operation between a hypothesized label sequence and ones of the reference label sequences.

19. The method according to claim 15, wherein the MBR loss operation comprises a sequence probability given the training data.

20. A non-transitory computer readable medium storing a program causing a computer to execute a process, the process comprising:
    minimum Bayes risk (MBR) training a sequence-to-sequence model by MBR training; and
    during an N-best generation of the MBR training, applying, by softmax smoothing, smoothing to label prediction distribution and generating scores at each scores at each step of a beam-search of the N-best generation of the MBR training.

* * * * *